(12) United States Patent
Soga

(10) Patent No.: US 7,362,367 B2  
(45) Date of Patent: Apr. 22, 2008

(54) DIGITAL CAMERA HAVING COMPOSITION DETERMINING OPERATION FOR TEMPORARILY STORING FREEZE IMAGE DATA REPRESENTATIVE OF A COMPOSITION

(75) Inventor: Takashi Soga, Asaka (JP)

(73) Assignee: Fujifilm Corporation, Tokyo (JP)

( * ) Notice: Subject to any disclaimer, the term of this patent is extended or adjusted under 35 U.S.C. 154(b) by 762 days.

(21) Appl. No.: 10/664,162

(22) Filed: Sep. 17, 2003

(65) Prior Publication Data

US 2004/0174455 A1 Sep. 9, 2004

(30) Foreign Application Priority Data

Sep. 27, 2002 (JP) ............................. 2002-283567

(51) Int. Cl.
- H04N 5/222 (2006.01)
- H04N 5/232 (2006.01)
- H04N 5/238 (2006.01)
- G03B 13/00 (2006.01)

(52) U.S. Cl. .................. 348/333.03; 348/333.02; 348/348; 348/364

(58) Field of Classification Search ............. 348/239, 348/333.01, 333.02, 333.11, 333.12, 333.03, 348/333.04, 333.05, 333.06–333.1; 382/212, 382/213, 214

See application file for complete search history.

(56) References Cited

U.S. PATENT DOCUMENTS 6,362,851 B1* 3/2002 Lavelle et al. ......... 348/333.01

2001/0008423 A1* 7/2001 Nakamura ................... 348/345  
2002/0149689 A1* 10/2002 Sannoh et al. ......... 348/333.02  
2003/0169350 A1* 9/2003 Wiezel et al. ............... 348/239

FOREIGN PATENT DOCUMENTS

JP 08-294025 A 11/1996  
JP 2000-270242 * 9/2000

* cited by examiner

Primary Examiner—Ngoc-Yen Vu  
Assistant Examiner—Albert H Cutler  
(74) Attorney, Agent, or Firm—Birch, Stewart, Kolasch & Birch, LLP (57) ABSTRACT

It is an object of the present invention to provide a digital camera that forms, on a solid state imaging device, an object image resulting from object light transmitted via a photographing optical system, to obtain image data representative of the object image, the digital camera enabling a photographer to take his or her intended photograph accurately. After a composition determining operation has been finished and before an actual photographing operation is started, an image display section displays a composition and a through image in a superimposing manner. The distance to an object is measured when the composition determining operation is performed. During the actual photographing operation, focusing is carried out in accordance with the distance measured when the composition determining operation is performed.

10 Claims, 5 Drawing Sheets

DIGITAL CAMERA HAVING COMPOSITION DETERMINING OPERATION FOR TEMPORARILY STORING FREEZE IMAGE DATA REPRESENTATIVE OF A COMPOSITION

This nonprovisional application claims priority under 35 U.S.C. 119(a) on Patent Application No. 2002-283567 filed in JAPAN on Sep. 27, 2002, which is herein incorporated by reference.

BACKGROUND OF THE INVENTION

1. Field of the Invention

The present invention relates to a digital camera that forms, on a solid state imaging device, an object image resulting from object light transmitted via a photographing optical system, to obtain image data representative of the object image.

2. Description of the Related Art

It is assumed that a user of a camera requests a third person to photograph his or her photograph. Then, even if the user informs the third person of his or her intended composition, it is not always possible to obtain a photograph with the intended composition.

To solve this problem, a camera has been proposed which displays, in a superimposing manner, a composition based on freeze image data obtained by a user of a camera who request photographing his or her photo, using a composition determining operation and a through image based on through image data representative of an object image currently formed on a solid state imaging device, so that the photographer can carry out photographing with the user's intended composition, by matching the through image with the composition (for example, see Patent Document 1).

[Patent Document 1]

Japanese Patent Laid-Open No. 8-294025

According to the camera proposed in Patent Document 1, mentioned above, when the third person requested to carry out photographing matches the through image with the displayed composition and then depresses a shutter release button, the person requesting the third person to photograph himself or herself can obtain a photograph with his or her intended composition.

Cameras are commonly known which have a function called "AF lock" or "AE lock". With such a camera, halfway pressing the shutter release button causes the distance to the desired object to be measured and also causes the luminance of the object to be measured. Subsequently, a photograph with its focus and exposure properly adjusted can be obtained by determining a composition while the shutter release button remains halfway pressed and then fully pressing the shutter release button.

However, it is contemplated that the third person requested to carry out photographing cannot appropriately use the AF or AE lock function or executes photographing without being conscious of these functions. As a result, even with the above described camera that enables the photographer to take a photograph with the composition intended by the person who requested photographing, the resulting photograph may be out of focus or overexposed.

SUMMARY OF THE INVENTION

In view of the above circumstances, it is an object of the present invention to provide a digital camera that enables a photographer to take accurately his or her intended photograph.

To achieve this object, the present invention provides a first digital camera that forms, on a solid state imaging device, an object image resulting from object light transmitted via a photographing optical system, to obtain image data representative of the object image, the digital camera characterized by comprising:

a mode switching section that obtains and temporarily stores freeze image data representative of a composition in response to a composition determining operation and switches to an arbitrary one of a plurality of photographing modes in response to a actual photographing operation, the photographing modes including a photographing memory mode in which image data on a desired object is obtained;

an image display section that displays an image based on the image data;

a distance measuring section that measures a distance to the object; and a focusing section that performs focusing in accordance with the distance measured by the distance measuring section, and in that in the photographing memory mode, after the composition determining operation has been finished and before the actual photographing operation is started, the image display section displays, in a superimposing manner, a composition based on the freeze image data obtained as a result of the composition determining operation and a through image based on through image data representative of the object image currently formed on the solid state imaging device, and in the photographing memory mode, the focusing section causes the distance measuring section to measure the distance when the composition determining operation is performed, and during the actual photographing operation, performs focusing in accordance with the distance measured when the composition determining operation is performed.

With the first digital camera according to the present invention, after the composition determining operation has been finished and before the actual photographing operation is started, the image display section displays the composition and the through image so that they are superimposed on each other. Accordingly, when the third person requested to carry out photographing matches the through image with the displayed composition and then depresses a shutter release button, the person requesting the third person to photograph himself or herself can obtain a photograph with his or her intended composition. Furthermore, with the first digital camera according to the present invention, the distance is measured when the composition determining operation is performed. During the actual photographing operation, focusing is performed in accordance with the distance measured when the composition determining operation is performed. Thus, by matching the through image with the displayed composition and then depressing a shutter release button, the third person requested to carry out photographing can take a photograph focusing on the object without being conscious of the focus point of the camera. This provides a digital camera that enables a photographer to take accurately his or her intended photograph.

Further, to achieve the above object, the present invention provides a second digital camera that forms, on a solid state imaging device, an object image resulting from object light transmitted via a photographing optical system, to obtain image data representative of the object image, the digital camera comprising:

a mode switching section that obtains and temporarily stores freeze image data representative of a composition in response to a composition determining operation and switches to an arbitrary one of a plurality of photographing modes in response to an actual photographing operation, the photographing modes including a photographing memory mode in which image data on a desired object is obtained;

an image display section that displays an image based on the image data;

a luminance measuring section that measures a luminance of the object; and an exposure adjusting section that adjusts exposure in accordance with the luminance measured by the luminance measuring section, and in that in the photographing memory mode, after the composition determining operation has been finished and before the actual photographing operation is started, the image display section displays, in a superimposing manner, a composition based on the freeze image data obtained as a result of the composition determining operation and a through image based on through image data representative of the object image currently formed on the solid state imaging device, and in the photographing memory mode, the exposure adjusting section causes the luminance measuring section to measure the luminance when the composition determining operation is performed, and during the actual photographing operation, adjusts the exposure in accordance with the luminance measured when the composition determining operation is performed.

With the second digital camera according to the present invention, as in the case with the first digital camera, after the composition determining operation has been finished and before the actual photographing operation is started, the image display section displays the composition and the through image so that they are superimposed on each other. Accordingly, the person requesting the third person to photograph himself or herself can obtain a photograph with his or her intended composition. Furthermore, with the second digital camera according to the present invention, the luminance of the object is measured when the composition determining operation is performed. During the actual photographing operation, the exposure is adjusted in accordance with the luminance measured when the composition determining operation is performed. Thus, by matching the through image with the displayed composition and then depressing a shutter release button, the third person requested to carry out photographing can take a photograph with its exposure adjusted in accordance with the luminance of the object, without being conscious of the luminance of the object. This provides a digital camera that enables a photographer to take accurately his or her intended photograph.

Furthermore, to achieve the above object, the present invention provides a third digital camera that forms, on a solid state imaging device, an object image resulting from object light transmitted via a photographing optical system, to obtain image data representative of the object image, the digital camera comprising:

a mode switching section that obtains and temporarily stores freeze image data representative of a composition in response to a composition determining operation and switches to an arbitrary one of a plurality of photographing modes in response to an actual photographing operation, the photographing modes including a photographing memory mode in which image data on a desired object is obtained;

an image display section that displays an image based on the image data;

a distance measuring section that measures a distance to the object;

a focusing section that adjusts a focus in accordance with the distance measured by the distance measuring section;

a luminance measuring section that measures a luminance of an object;

an exposure adjusting section that adjusts exposure in accordance with the luminance measured by the luminance measuring section, wherein in the photographing memory mode, after the composition determining operation has been finished and before the actual photographing operation is started, the image display section displays, in a superimposing manner, a composition based on the freeze image data obtained as a result of the composition determining operation and a through image based on through image data representative of the object image currently formed on the solid state imaging device, in the photographing memory mode, the focus adjusting section causes the distance measuring section to measure the distance when the composition determining operation is performed, and during the actual photographing operation, performs focusing in accordance with the distance measured when the composition determining operation is performed, and in the photographing memory mode, the exposure adjusting section causes the luminance measuring section to measure the luminance when the composition determining operation is performed, and during the actual photographing operation, adjusts the exposure in accordance with the luminance measured when the composition determining operation is performed.

The third digital camera according to the present invention has the characteristics of the first digital camera and the second digital camera according to the preset invention. Thus, the third digital camera enables the photographer to take his or her intended photograph more accurately.

Here, preferably, the first and third digital cameras further comprise a shutter release button operated both during the composition determining operation and during the actual photographing operation and operated at two levels including a halfway press and a full press and in the photographing memory mode, the focusing section causes the distance measuring section to measure the distance in response to a halfway press operation performed on the shutter release button during the composition determining operation.

With this arrangement, the measurement of the luminance and the determination of the composition can be accomplished without unfamiliar operation for the photographer.

Further, preferably, the second and third digital cameras comprise a shutter release button operated both during the composition determining operation and during the actual photographing operation and operated at two levels including a halfway press and a full press, and in the photographing memory mode, the exposure adjusting section causes the luminance measuring section to measure the luminance in response to a halfway press operation performed on the shutter release button during the composition determining operation.

With this arrangement, the measurement of the luminance and the determination of the composition can be accomplished without unfamiliar operation for the photographer.

Furthermore, the first, second, and third digital cameras further comprise a photographing completion notifying section that notifies a user of completion of photographing in response to the actual photographing operation.

With the digital camera provided with such a photographing completion notifying section, the photographer or the person as an object can confirm that the photographing operation has been completed. This prevents, for example, a failure to obtain a photograph, which may occur if the third person requested to carry out photographing has not fully depressed the shutter release button.

As described above, the present invention provides a digital camera that enables the photographer to take his or her intended photograph more accurately.

DETAILED DESCRIPTION OF THE PREFERRED EMBODIMENTS

An embodiment of the present invention will be described below.

Figure 1:
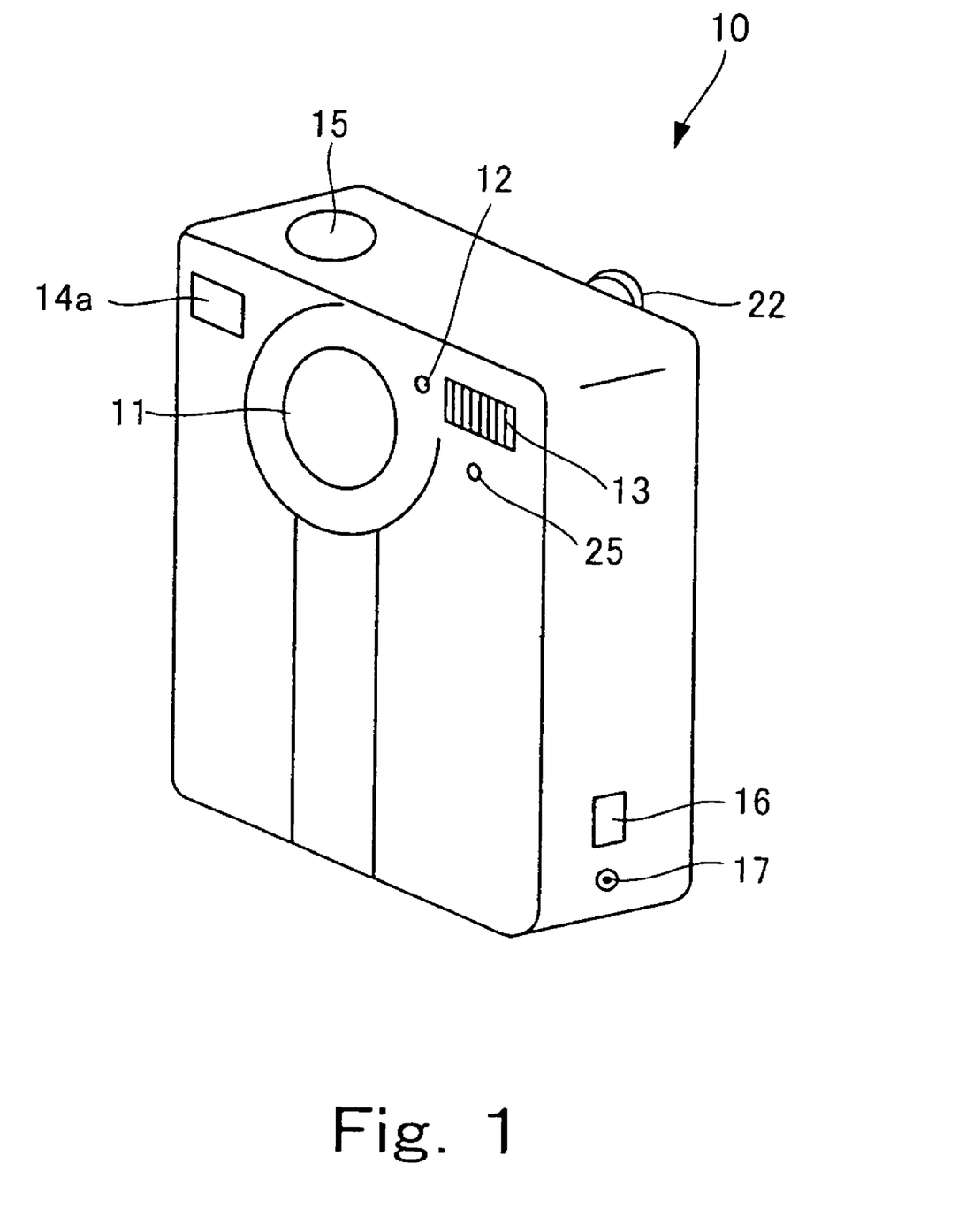
FIG. 1 is a schematic perspective view of a camera according to a first embodiment of the present invention as viewed from its front and from obliquely above.

FIG. 1 is a schematic perspective view of a digital camera according to an embodiment of the present invention as viewed from the front obliquely above.

A digital camera 10, shown in FIG. 1, forms an image of an object on a charge coupled device (CCD) solid state imaging device to load image data representative of the object as a signal.

A photographing lens 11 is provided in a front surface of the digital camera 10. The photographing lens 11 projects incident object light on a photographing surface of the internally arranged CCD solid state imaging device (not shown) to form an image. The CCD image pickup element generates image data representative of the object.

Further, in the front surface of the digital camera 10, a flash dimming window 12 is provided to the left of and obliquely above the photographing lens 11. A flash emitting window 13 is provided to the left of the flash dimming window 12. A self timer LED 25 is provided below the flash emitting window 13. An optical finder objective window 14a is provided to the right of and obliquely above the photographing lens 11.

Furthermore, a shutter release button 15 is provided at the right end of a top surface of the digital camera 10. A photographing mode dial 22 will be described with reference to FIG. 2; the photographing mode dial 22 is provided at the top of a rear surface and projects partly from the top surface.

Further, a USB terminal 16 and a power input terminal 17 are provided at the bottom of a left side of the digital camera 10 in this order from the top; the USB terminal 16 connects to a Universal Serial Bus (USB) cable used to transmit image data obtained by photographing to a personal computer or the like, and the power input terminal 17 connects to a power cable used to supply external power to the digital camera 10.

Figure 2:
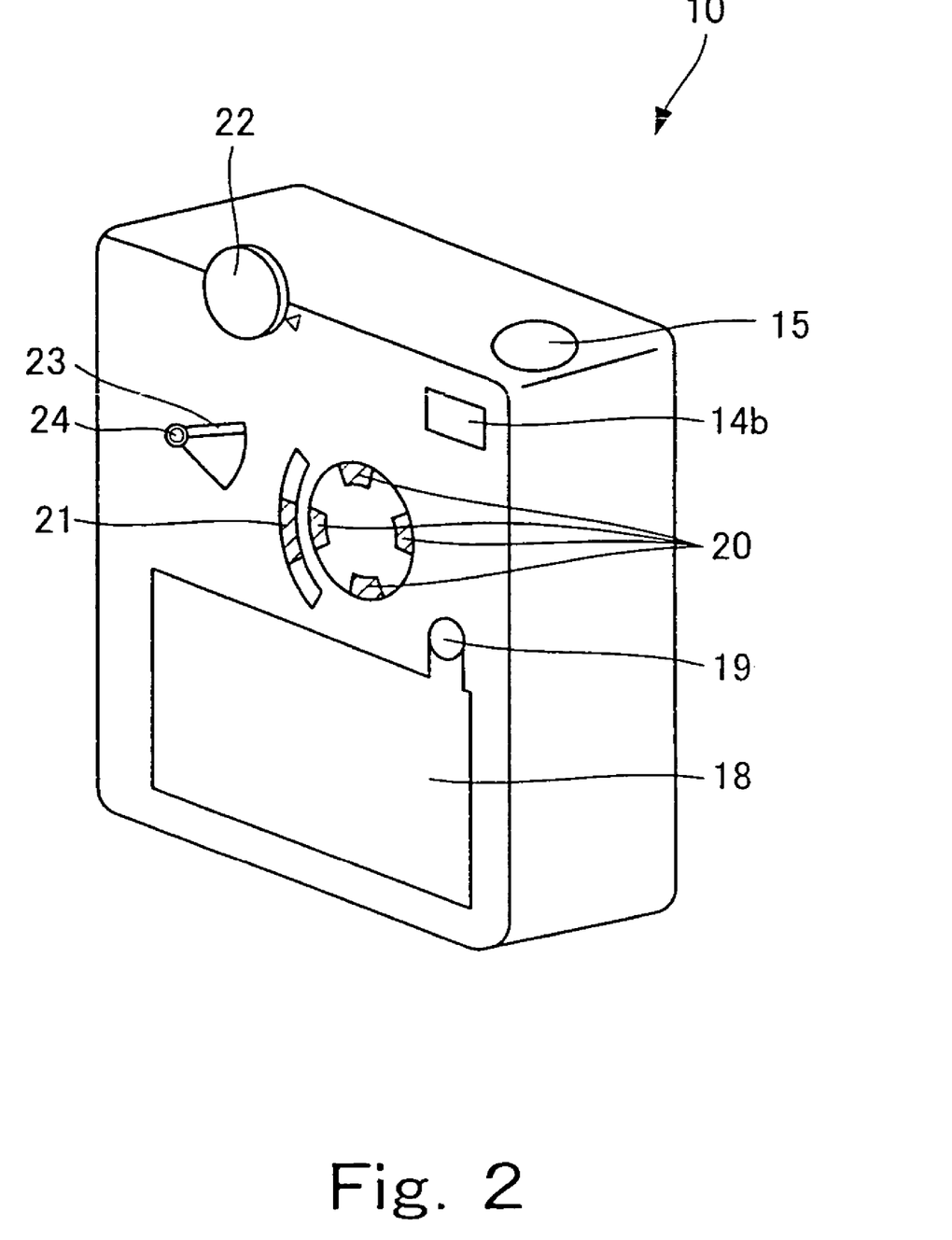
FIG. 2 is a schematic perspective view of the camera shown in FIG. 1 as viewed from its rear and from obliquely above.

FIG. 2 is a schematic perspective view of the rear surface of the digital camera shown in FIG. 1, as viewed from obliquely above.

The following are provided on the rear surface of the digital camera 10: an optical finder ocular window 14b, a liquid crystal display (LCD) panel 18 that displays images and a date, an LCD panel activation button 19 used to turn on/off image display on the LCD panel 18, a cross key 20 operated to select a variation and to carry out zooming, a menu/OK switch 21 used to display a menu on the LCD panel 18 which allows the setting of a date and time and the like and to specify the contents of the menu, a photographing mode dial 22 that is an example of a mode switching function according to the present invention, a function selection lever 23 used to select either a "photographing recording" function that takes a photograph or an "image data reproduction" function that reproduces image data recorded by taking a photograph, and a main switch 24 provided on the axis of the function selection lever 23.

With the digital camera 10, sliding the function selection lever 23 to an upper side selects the "photographing recording" function. On the other hand, sliding the function selection lever 23 to a lower side selects the "image data reproduction" function. Further, when the "photographing recording" function is selected using the function selection lever 23, the photographing mode dial 22 may be rotated to select one of the followings :a "person photographing" mode suitable for photographing a person, a "scenery photographing" mode suitable for photographing a scenery, a "sport mode" suitable for photographing a fast moving object, a "self timer" mode that provides a time difference between the depression of the shutter release button 15 and actual photographing, and a "self photographing" mode suitable for photographing a photographer himself or herself. Furthermore, if the "person photographing" mode is selected using the photographing mode dial 22, depressing the photographing mode dial 22 selects a "photographing memory" mode that will be described later.

Figure 3:
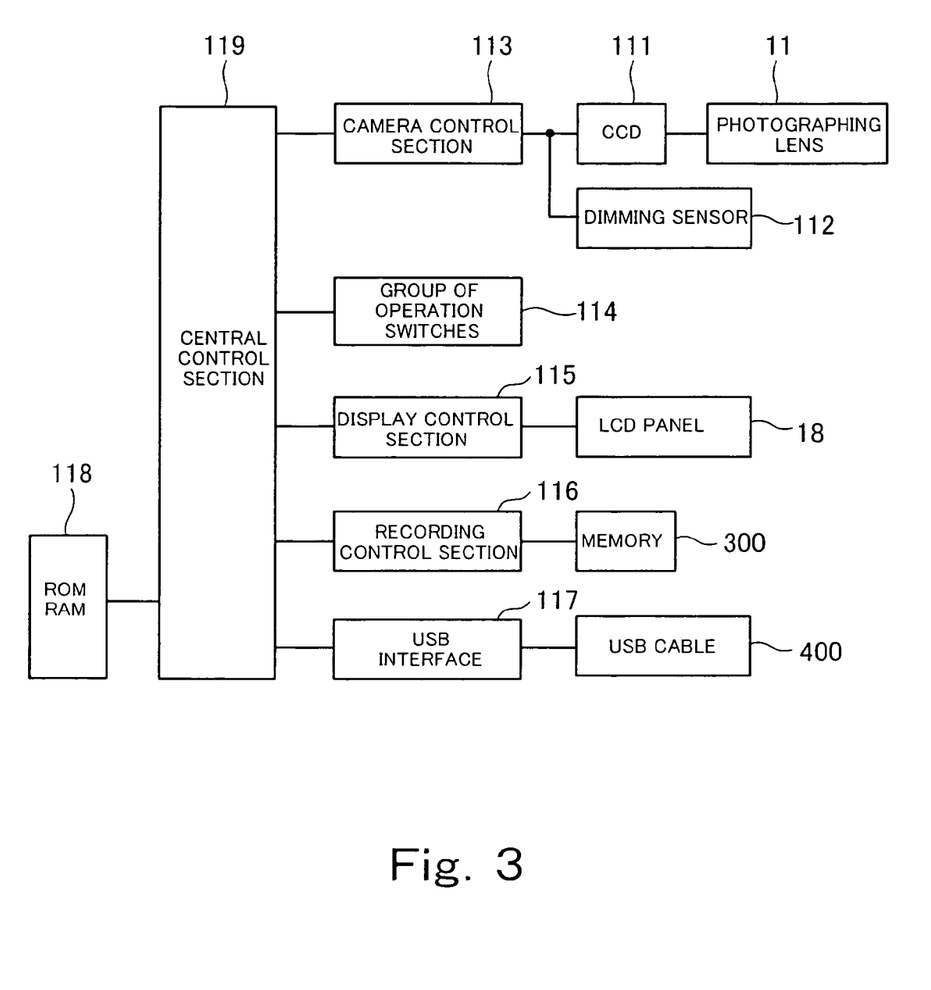
FIG. 3 is an internal block diagram showing functions of the camera shown in FIGS. 1 and 2.

FIG. 3 is an internal block diagram showing the functions of the digital camera shown in FIGS. 1 and 2.

The digital camera 10 shown in FIGS. 1 and 2 contains a CCD solid state imaging device 111 on which an image of an object transmitted via the above described photographing lens 11, a dimming sensor 112 that receives light emitted by the flash emission window 13 and reflected by the object, and a digital camera control section 113 that, for example, automatically adjusts the white balance of the image of the object formed on the CCD solid state imaging device 111 or stops the emission by the flash emission window 13 on the basis of the quantity of reflected light received by the dimming sensor 112, as shown in FIG. 3. Furthermore, the digital camera 10 contains a display control section 115 that controls the display of images or the like by the LCD panel 18, a recording control section 116 provided with a memory 300 to record image data in the installed memory 300, a USB interface 117 having a USB cable 400 connected to the USB terminal 16 (see FIG. 1) to transmit and receive image data to and from external equipment such as a personal computer, a ROM/RAM 118, and the like.

The CCD solid state imaging device 111 and the digital camera control section 113 cooperate in providing a function that measures the distance to the object by detecting the contrast of the object on the basis of image data obtained by the CCD solid state imaging device 111 and a function that measures the luminance of the object on the basis of the level of the image data obtained by the CCD solid state imaging device 111. Thus, the CCD solid state imaging device 111 and the digital camera control section 113 are examples of the functions of a distance measuring section and a luminance measuring section according to the present invention. When the "photographing memory" mode is selected using the photographing mode dial 22 shown in FIG. 2, the ROM/RAM 118 also provides functions of temporarily storing a distance or luminance measured when a composition determining operation is performed and of temporarily storing freeze image data representing a composition in response to the composition determining operation. The composition determining operation will be described later.

Moreover, the digital camera 10 is provided with a central control section 119 that controls the whole digital camera 10, a group of operation switches 114 composed of the LCD panel activation button 19, cross key 20, menu/OK switch 21, photographing mode dial 22, function selection lever 23, and main switch 24, shown in FIG. 2, and the shutter release button 15, shown in FIGS. 1 and 2. A photograph is taken by operating the group of operation switches 114 to set a desired photographing ready state and depressing the shutter release button 15.

The shutter release button 15 has a two depression states including a halfway press state and a full press state. The halfway press allows the measurement of the distance to the object and its luminance. The full press allows focusing on the distance to the object measured during the halfway press state, while allowing a photograph to be taken with an exposure based on the luminance of the object measured during the halfway press state. However, if the "photographing memory" mode is selected, the distance to the object and its luminance are measured when the shutter release button 15 is halfway pressed during the composition determining operation. Photographing during an actual photographing operation reflects the distance to the object and its luminance both measured during the composition determining operation. Details are described below.

The central control section 119 provides a function of focusing in accordance with the distance measured by the CCD solid state imaging device 111 and a function that adjusts the exposure in accordance with the luminance measured by the CCD solid state imaging device 111. The central control section 119 is an example of the functions of a focusing section and an exposure adjusting section according to the present invention.

The subject of the present invention is not the case in which the photographing mode dial 22, shown in FIG. 2, is used to select the "scenery photographing" mode, the "sport" mode, the "self timer" mode, and the "self photographing" mode. Thus, detailed description will be given of the "photographing memory" mode, selected by depressing the photographing mode dial 22 if the photographing mode dial 22 is used to select the "person photographing" mode, an example of the photographing memory mode according to the present invention.

Figure 4:
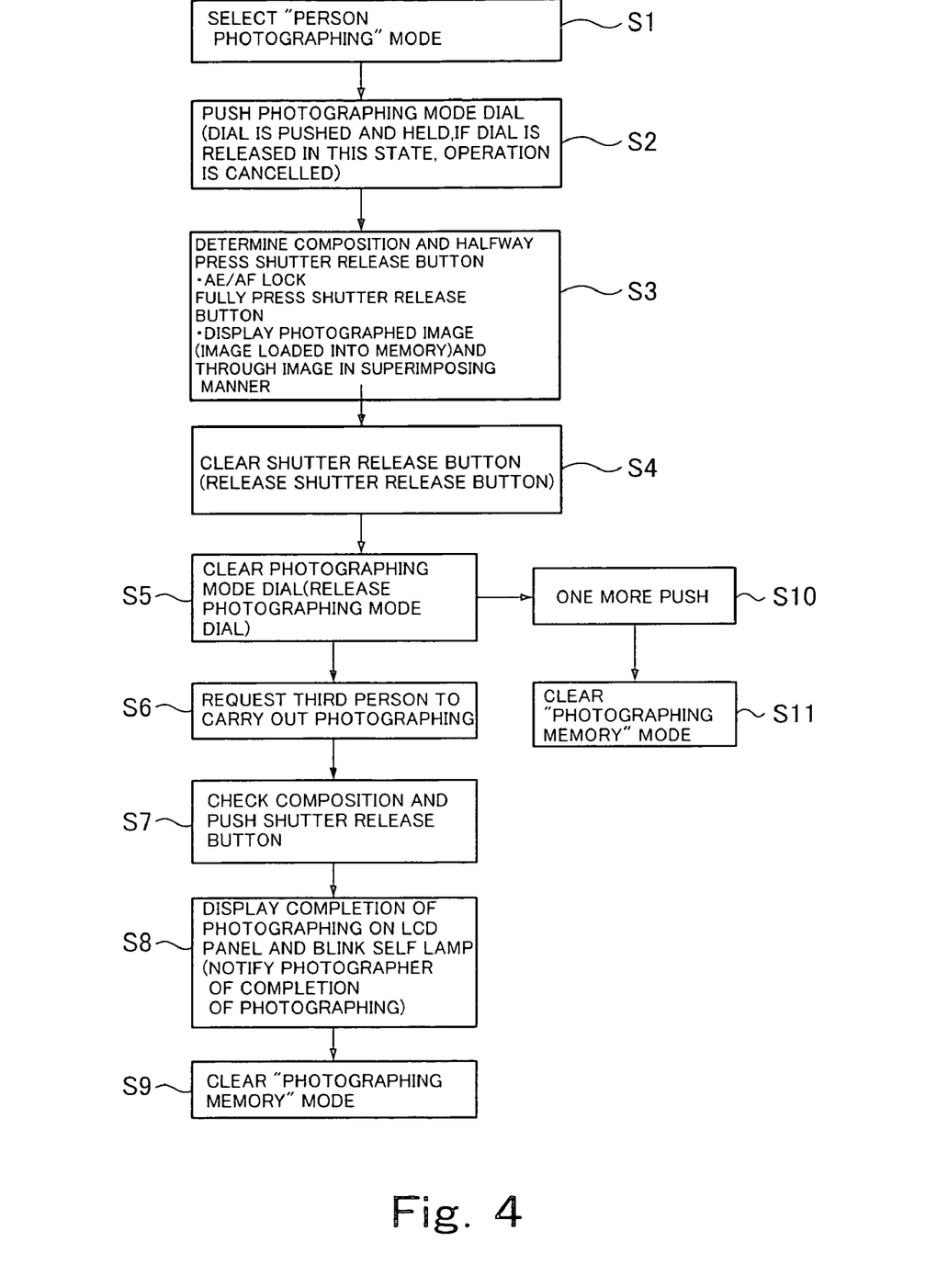
FIG. 4 is a flow chart illustrating the flow of photographing in a "photographing memory" mode.

FIG. 4 is a flow chart illustrating the flow of photographing in the "photographing memory" mode.

First, the "person photographing" mode is selected by rotating the photographing mode dial 22, shown in FIG. 2 (step S1).

Then, the photographing mode dial 22 is depressed and held down to select the "photographing memory" mode (step S2). When the photographing mode dial 22 is released from the depressed state, the "photographing memory" mode is cleared to select the normal "person photographing" mode.

Figure 5:
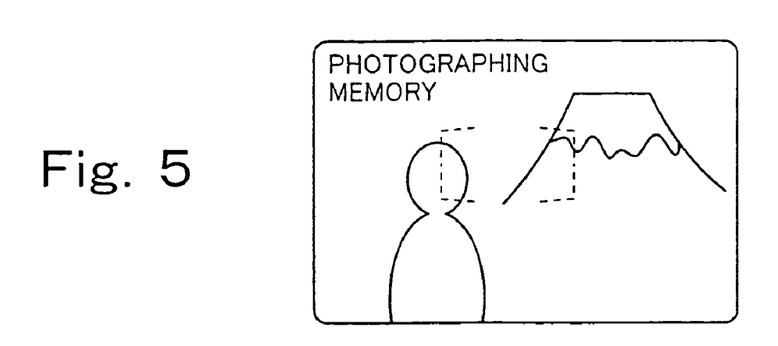
FIG. 5 is a view showing an example of display of a screen displayed on an LCD panel when the "photographing memory" mode is selected in step S2.

FIG. 5 shows an example of display of a screen displayed on the LCD panel when the "photographing memory" mode is selected in step S2.

This figure shows an example in which the LCD panel 18, shown in FIGS. 2 and 3, displays a through image based on through image data representative of an object image currently formed on the CCD image pickup element 111, shown in FIG. 3, and the letters "photographing memory", provided in response to the selection of the "photographing memory" mode in step S2, shown in FIG. 4.

Then, with the "photographing memory" mode selected in step S2, a desired composition is determined. Subsequently, a halfway press operation, an example of the composition determining operation according to the present invention, is performed on the shutter release button 15, shown in FIGS. 1 and 2. Then, the distance to the object and its luminance at the time of the halfway press operation are measured. The measured distance and luminance are stored in the ROM/RAM 118 as shown in FIG. 3. Further, when the shutter release button 15 is fully pressed, freeze image data representative of a composition present at the time of the full press is stored in the ROM/RAM 118. Furthermore, after the full press operation has been finished and before the actual photographing operation, described later, is started, the LCD panel 18, shown in FIGS. 2 and 3, displays in a superimposed form the composition based on the freeze image data obtained by the full press operation and the through image based on the through image data representative of the object image currently formed on the CCD solid state imaging device 111, shown in FIG. 3 (step S3).

In this embodiment, when the shutter release button 15 is halfway pressed, the distance to the object and its luminance are measured. On the other hand, when the shutter release button 15 is fully pressed, the freeze image data representative of the composition is loaded. Consequently, by directing the camera toward an object for which the focus and luminance are to be adjusted, halfway pressing the shutter release button 15, subsequently redirecting the camera, and then fully pressing the button 15, the focus and luminance as well as the composition can be independently adjusted without the need to focus on the center of the composition.

Figure 6:
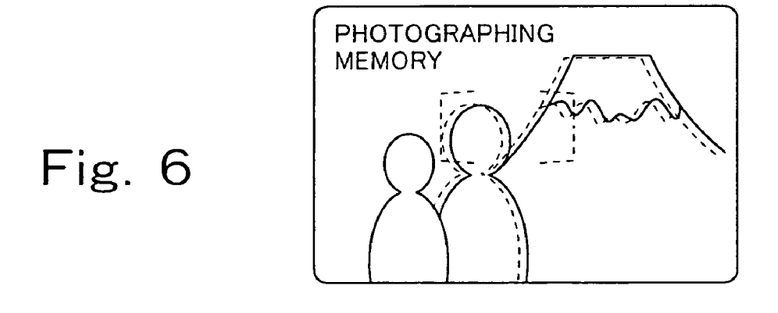
FIG. 6 is a view showing an example of display of a screen in which a composition and a through image are displayed on the LCD panel so as to be superimposed on each other in step S3.

FIG. 6 shows an example of display of a screen in which the composition and the through image are displayed on the LCD panel so as to be superimposed on each other in step S3.

This figure shows an example in which the composition based on the freeze image data is represented by broken lines, whereas the through image based on the through image data is represented by solid lines. In this figure, the composition and the through image are displayed on the LCD panel 18, shown in FIGS. 2 and 3, so as to be superimposed on each other.

Then, the shutter release button 15 is released from the depressed state established in step S3 (step S4).

Further, the photographing mode dial 22, held down from steps S2 through step S4, is released from the depressed state (step S5). After being released from the depressed state in step S5, the photographing mode dial 22 is depressed again (step S10) to disable the operations from step S2 through step S5. Then, the "photographing memory" mode is cleared to select the normal "person photographing" mode (step S1).

Then, the user requests a third person to photograph himself or herself (step S6). The user then enters the composition. The third person checks the composition on the LCD panel 18, on which the composition and the through image are displayed so as to be superimposed on each other. The third person then performs a depression operation on the shutter release button 15, an example of the actual photographing operation in the present invention. Thus, the central control section 119, shown in FIG. 3, carries out focusing based on the distance stored in the ROM/RAM 118 in step S3 and exposure adjustment based on the luminance stored in the ROM/RAM 118 in step S3. The photographing in the "photographing memory" mode is completed (step S7).

Figure 7:
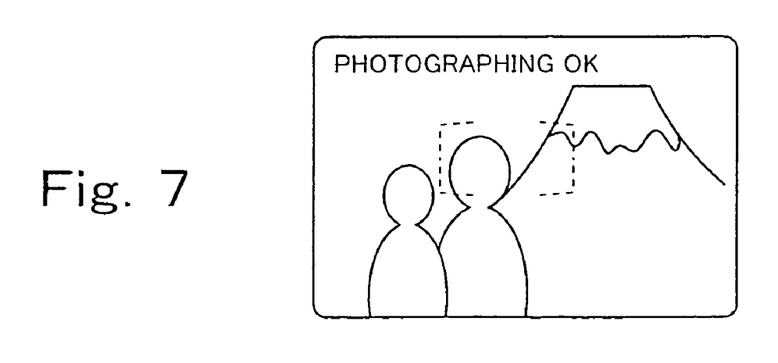
FIG. 7 is a view showing an example of display of a screen displayed on the LCD panel when a third person matches a composition with a through image on the LCD panel 18, on which the composition and the through image are displayed so as to be superimposed on each other in step 7.

FIG. 7 shows an example of display of a screen displayed on the LCD panel when the third person matches the composition with the through image on the LCD panel 18, on which the composition and the through image are displayed so as to be superimposed on each other in step S7.

This figure shows an example in which the letters "photographing OK" are displayed on the LCD panel 18 when the third person matches the composition with the through image on the LCD panel 18, shown in FIGS. 2 and 3, on which the composition and the through image are displayed so as to be superimposed on each other.

The LCD panel 18, shown in FIGS. 2 and 3, and the self timer LED 25, shown in FIG. 1, cooperate in providing the function of a photographing completion notifying section in the present invention. With this function, once the photographing in the "photographing memory" mode is completed in step S7, the letters "photographing completed" are displayed on the LCD panel 18 to notify the third person as a photographer that the photographing operation has been completed. Further, the self timer LED 25 is blinked to notify the user as an object that the photographing operation has been completed (step S8).

Further, when the photographing in the "photographing memory" mode is completed in step S7, the "photographing memory" mode is cleared to select the normal "person photographing" mode (step S9).

As described above, with the digital camera according to the present embodiment, after a composition determining operation has been finished and before an actual photographing operation is started, the image display section displays a composition and a through image in a superimposing manner. Accordingly, when a third person requested to carry out photographing matches the through image to the composition displayed as a result of the composition determining operation and then depresses the shutter release button, a person requesting the third person to photograph himself or herself can obtain a photograph with his or her intended composition. Furthermore, with the digital camera according to the present embodiment, the distance to the object is measured when the composition determining operation is performed. During an actual photographing operation, focusing is carried out in accordance with the distance measured when the composition determining operation is performed. Thus, by matching the composition with the through image and then depressing a shutter release button, the third person requested to carry out photographing can take a photograph focusing on the object without being conscious of the focus point of the camera. Furthermore, with the digital camera according to the present embodiment, the luminance of the object is measured when the composition determining operation is performed. During the actual photographing operation, the exposure is adjusted in accordance with the luminance measured when the composition determining operation is performed. Thus, by matching the composition with the through image and then depressing a shutter release button, the third person requested to carry out photographing can take a photograph with its exposure adjusted in accordance with the luminance of the object, without being conscious of the luminance of the object. Moreover, with the digital camera according to the present embodiment, the photographer or the person as an object can confirm that the photographing operation has been completed. This prevents, for example, a failure to obtain a photograph which may occur if the third person requested to carry out photographing has not fully depressed the shutter release button.

What is claimed is:

1. A digital camera that forms, on a solid state imaging device, an object image resulting from object light transmitted via a photographing optical system, to obtain image data representative of the object image, the digital camera comprising:

an internal memory;

an installed memory, different from the internal memory;

a mode switching section that switches the camera to an arbitrary one of a plurality of photographing modes to perform an actual photographing operation, at least one of the plurality of photographing modes including a photographing memory sub-mode in which image data on a desired object is obtained;

an image display section that displays an image based on the image data;

a distance measuring section that measures a distance to the object;

a focusing section that performs focusing in accordance with the distance measured by the distance measuring section; and a controller for controlling operations of the camera, wherein in the photographing memory sub-mode of the at least one of the plurality of photographing modes, the controller:

directs performance of a composition determining operation in which freeze image data, representative of through image data currently formed on the solid state imaging device, is obtained and temporarily stored in the internal memory, directs the focusing section to cause the distance measuring section to measure the distance when the composition determining operation is performed and to temporarily store the distance in the internal memory, and after the composition determining operation has been finished and before the actual photographing operation of the at least one of the plurality of photographing modes corresponding to the photographing memory sub-mode is started, directs the image display section to display, in a superimposing manner, a composition based on the freeze image data obtained as a result of the composition determining operation and the through image representative of the object image currently formed on the solid state imaging device, and during the actual photographing operation in the at least one of the plurality of photographing modes corresponding to the photographing memory sub-mode, the controller directs performing focusing in accordance with the distance measured when the composition determining operation was performed.

2. The digital camera according to claim 1, further comprising a shutter release button operated both during the composition determining operation and during the actual photographing operation and operated at two levels including a halfWay press and a full press, and wherein in the photographing memory mode, the focusing section causes the distance measuring section to measure the distance in response to a halfway press operation performed on the shutter release button during the composition determining operation.

3. The digital camera according to claim 1, further comprising a photographing completion notifying section that notifies a user of completion of photographing in response to the actual photographing operation.

4. A digital camera that forms, on a solid state imaging device, an object image resulting from object light transmitted via a photographing optical system, to obtain image data representative of the object image, the digital camera comprising:

an internal memory;

an installed memory, different from the internal memory;

a mode switching section that switches the camera to an arbitrary one of a plurality of photographing modes to perform an actual photographing operation, at least one of the plurality of photographing modes including a photographing memory sub-mode in which image data on a desired object is obtained;

an image display section that displays an image based on the image data;

a luminance measuring section that measures a luminance of the object;

an exposure adjusting section that performs adjusting exposure in accordance with the luminance measured by the luminance measuring section; and a controller for controlling operations of the camera, wherein in the photographing memory sub-mode of the at least one of the plurality of photographing modes, the controller:

directs performance of a composition determining operation in which freeze image data, representative of through image data currently formed on the solid state imaging device, is obtained and temporarily stored in the internal memory, directs the exposure adjusting section to cause the luminance measuring section to measure the luminance when the composition determining operation is performed and to temporarily store the luminance in the internal memory, and after the composition determining operation has been finished and before the actual photographing operation of the at least one of the plurality of photographing modes corresponding to the photographing memory sub-mode is started, directs the image display section to display, in a superimposing manner, a composition based on the freeze image data obtained as a result of the composition determining operation and the through image representative of the object image currently formed on the solid state imaging device, and during the actual photographing operation in the at least one of the plurality of photographing modes corresponding to the photographing memory sub-mode, the controller directs performing exposure adjusting in accordance with the luminance measured when the composition determining operation was performed.

5. The digital camera according to claim 4, further comprising a shutter release button operated both during the composition determining operation and during the actual photographing operation and operated at two levels including a halfway press and a full press, and wherein in the photographing memory mode, the exposure adjusting section causes the luminance measuring section to measure the luminance in response to a halfway press operation performed on the shutter release button during the composition determining operation.

6. The digital camera according to claim 4, further comprising a photographing completion notifying section that notifies a user of completion of photographing in response to the actual photographing operation.

7. A digital camera that forms, on a solid state imaging device, an object image resulting from object light transmitted via a photographing optical system, to obtain image data representative of the object image, the digital camera comprising:

an internal memory;

an installed memory, different from the internal memory;

a mode switching section that switches the camera to an arbitrary one of a plurality of photographing modes to perform an actual photographing operation, at least one of the plurality of photographing modes including a photographing memory sub-mode in which image data on a desired object is obtained;

an image display section that displays an image based on the image data;

a distance measuring section that measures a distance to the object;

a focusing section that performs focusing in accordance with the distance measured by the distance measuring section;

a luminance measuring section that measures a luminance of the object;

an exposure adjusting section that performs adjusting exposure in accordance with the luminance measured by the luminance measuring section; and a controller for controlling operations of the camera, wherein in the photographing memory sub-mode of the at least one of the plurality of photographing modes, the controller:

directs performance of a composition determining operation in which freeze image data, representative of through image data currently formed on the solid state imaging device, is obtained and temporarily stored in the internal memory, directs the focusing section to cause the distance measuring section to measure the distance when the composition determining operation is performed and to temporarily store the distance in the internal memory, directs the exposure adjusting section to cause the luminance measuring section to measure the luminance when the composition determining operation is performed and to temporarily store the luminance in the internal memory, and after the composition determining operation has been finished and before the actual photographing operation of the at least one of the plurality of photographing modes corresponding to the photographing memory sub-mode is started, directs the image display section to display, in a superimposing manner, a composition based on the freeze image data obtained as a result of the composition determining operation and the through image representative of the object image currently formed on the solid state imaging device, and during the actual photographing operation in the at least one of the plurality of photographing modes corresponding to the photographing memory sub-mode, the controller directs performing focusing in accordance with the distance measured when the composition determining operation was performed and directs performing exposure adjusting in accordance with the luminance measured when the composition determining operation was performed.

8. The digital camera according to claim 7, further comprising a shutter release button operated both during the composition determining operation and during the actual photographing operation and operated at two levels including a halfway press and a full press, and wherein in the photographing memory mode, the focusing section causes the distance measuring section to measure the distance in response to a halfway press operation performed on the shutter release button during the composition determining operation.

9. The digital camera according to claim 7, further comprising a shutter release button operated both during the composition determining operation and during the actual photographing operation and operated at two levels including a halfway press and a full press, and wherein in the photographing memory mode, the exposure adjusting section causes the luminance measuring section to measure the luminance in response to a halfway press operation performed on the shutter release button during the composition determining operation.

10. The digital camera according to claim 7, further comprising a photographing completion notifying section that notifies a user of completion of photographing in response to the actual photographing operation.

* * * * *